(12) United States Patent
Kauffman et al.

(10) Patent No.: US 7,253,895 B2
(45) Date of Patent: Aug. 7, 2007

(54) IMAGE DETECTION AND IDENTIFICATION DEVICE

(75) Inventors: Christopher L. Kauffman, Lake Zurich, IL (US); Sung-Shik Yoo, Palatine, IL (US); Curtis Harkrider, Wheaton, IL (US); Philip Minarik, Schaumburg, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 144 days.

(21) Appl. No.: 11/103,304

(22) Filed: Apr. 11, 2005

(65) Prior Publication Data

US 2006/0227322 A1 Oct. 12, 2006

(51) Int. Cl.
*G01J 3/28* (2006.01)

(52) U.S. Cl. .......................... 356/326; 356/73; 356/328

(58) Field of Classification Search .................. 356/73, 356/326, 328, 302, 305
See application file for complete search history.

(56) References Cited

U.S. PATENT DOCUMENTS

| | | | |
|---|---|---|---|
| 4,674,871 A * | 6/1987 | Shifrin | 356/73 |
| 4,682,888 A * | 7/1987 | Welner | 356/73 |
| 5,479,015 A | 12/1995 | Rudman et al. | |
| 6,009,340 A | 12/1999 | Hsia | |
| 6,118,119 A * | 9/2000 | Ruschin | 356/305 |
| 6,823,599 B1 | 11/2004 | Minarik et al. | |

* cited by examiner

*Primary Examiner*—F. L. Evans
(74) *Attorney, Agent, or Firm*—Stetina Brunda Garred & Brucker

(57) ABSTRACT

An imaging device is provided which may include a plurality of imaging lenses. Each imaging lens may be placed adjacent to a dispersive element. The imaging lenses and dispersive element(s) may be placed adjacent to a focal plane array to allow light from a light emitting event traveling through the imaging lenses to be simultaneously received by the focal plane array. One of the optical channels provides continuous broadband imagery without interfering with the operation of the dispersive optical channels. No moving parts are required in this small compact system, and no reconfiguration during operation is necessary to enable any of the functions, they are all simultaneous. Information related to the light received by the focal plane array may be transmitted to a processor for processing to determine whether the light emitting event is of interest and to determine an event type. Broadband imagery provided may be used for situational awareness, targeting, and surveillance.

14 Claims, 4 Drawing Sheets

IMAGE DETECTION AND IDENTIFICATION DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to imaging devices, and more particularly to devices for detecting and identifying light emitting events.

Prior art imaging devices may comprise a rotating spectral separation element or subassembly installed in the collimated space of an imaging lens that is focused on a focal plane array and then may use spectro-tomographic image processing techniques to extract hyperspectral image data. Prior art imaging devices also may comprise a spectral separation element or subassembly placed in front of the imaging lens of a single channel imaging system comprised of an imaging lens focused on a focal plane array. The prior art imaging devices may receive light from a light-emitting event occurring within a scene. The emitted light travels through the spectral separation element or subassembly while the spectral separation element or subassembly is either in a fixed position or is rotating and is then received by the focal plane array. The focal plane array transmits information related to the received light to a processor. Thereafter, if the spectral separation element or subassembly is rotated to a second angular position, and the emitted light travels through the spectral separation element or subassembly and is received by the focal plane array, the focal plane array then transmits this information related to the received light to the processor and spectro-tomographic image proceesing is used to extract spatially organized spectral information. This process of spectral separation, reception and transmission is continued until the light-emitting event may be identified by the processor based on the transmitted information.

There are several shortcomings to the prior art. While the systems described are collecting this spectral information, they cannot collect broadband image information. Another problem is that in order to locate the source of a light-emitting event within the sensors' field of view in the case where the spectral separation element or subassembly rotates, the spectral separation element or subassembly must rotate enough to generate an arc in the light spectrum received by the focal plane array that is collected over several frames of the focal plane array in order to locate the position of the light-emitting event. This process takes-time-and requires that several frames of focal plane array imagery be processed. In order to perform this location function on short time events, the spectral separation element or subassembly must rotate at high rates, the focal plane array must operate at high frame rates that is transmitted to the processor at high rates that drives the required capability of the processor to a higher level. Another problem associated with the prior art imaging devices is that the prior art imaging devices must be stable for proper operation.

Accordingly, there is a need in the art for an improved imaging device.

BRIEF SUMMARY OF THE INVENTION

The present invention provides for an improved imaging device. In particular, the device may comprise of one or more dispersive elements, a plurality of imaging lens, focal plane array, processor and an output. These components in combination with each other provides for multiple frames of the light-emitting event simultaneously on the focal plane array.

The device may have at least one dispersive element or have a respective number of dispersive elements as there are imaging lenses. The dispersive elements may be placed adjacent to the imaging lenses. The imaging lenses may be placed adjacently to the focal plane array. The focal plane array may comprise a plurality of detectors which define a respective number of sets of detectors as there are imaging lenses. For example, if there are a first imaging lens, a second imaging lens and a third imaging lens, then light which travels through these lenses may be received by respective first set of detectors, second set of detectors and third set of detectors, all of which are elements of one focal plane array.

The dispersive elements split the light into a plurality of wavelength bands. These split wavelength bands provide a spectral profile of the light emitting event. Each dispersive element may split the light differently in that the first, second and third imaging lens may split the light into less number of wavelength bands compared to each successive dispersive element. Once the dispersive elements split the light into the plurality of wavelength bands, the imaging lenses focus the split light onto the focal plane array. Hence, the focal plane array may receive different spectral profiles of the light emitting event at different resolutions.

In use, the light travels through all the imaging lenses simultaneously. The light also travels through the first, second and third imaging lenses and may be respectively received by the first, second and third sets of detectors. The detectors transmit information regarding the light traveling through each respective first, second and third imaging lenses to a processor for processing. The processor then communicates the processed information to the output to indicate to a user whether the light emitting event is of interest. If the light emitting event is of interest then the output may also indicate the type of event.

In an aspect of the present invention, the focal plane array may receive the light passing through the plurality of imaging lenses, as discussed above. The information may be transmitted to the processor for processing. The processor may correlate the information received and transmitted by each set of detectors because the dispersive element, imaging lens and focal plane array are in a fixed relationship to each other. In other words, the light traveling through the first, second and third imaging lenses may always be received by respective first, second and third sets of detectors. Once the information is correlated, then the processor may build the spectral profile of the event and may compare such spectral profile with known spectral profiles of events of interest.

One lens may be used to collect broadband imagery just as a normal video camera would, adding additional functionality to the system. This broadband imaging channel is used to locate the source of the light emitting event as well as to provide continuous imagery to the processor that may be used for situational awareness, broadband targeting and surveillance.

All spectral and/or broadband information is contained in one frame of image data produced by the focal plane array, making image processing more streamlined and the time required to collect all of the necessary data minimal.

BRIEF DESCRIPTION OF THE DRAWINGS

An illustrative and presently preferred embodiment of the invention is shown in the accompanying drawings in which.

DETAILED DESCRIPTION OF THE INVENTION

The drawings referred to herein are for the purpose of illustrating the preferred embodiments of the present invention and not for the purposes of limiting the same. For example, certain portions of the detailed description make reference to detecting and identifying a single light emitting event 10a within a scene 12. However, it is also contemplated within the scope of the present invention that the aspects of the present invention described herein may detect and identify two simultaneous light emitting events 10a within the scene 12.

Figure 1:
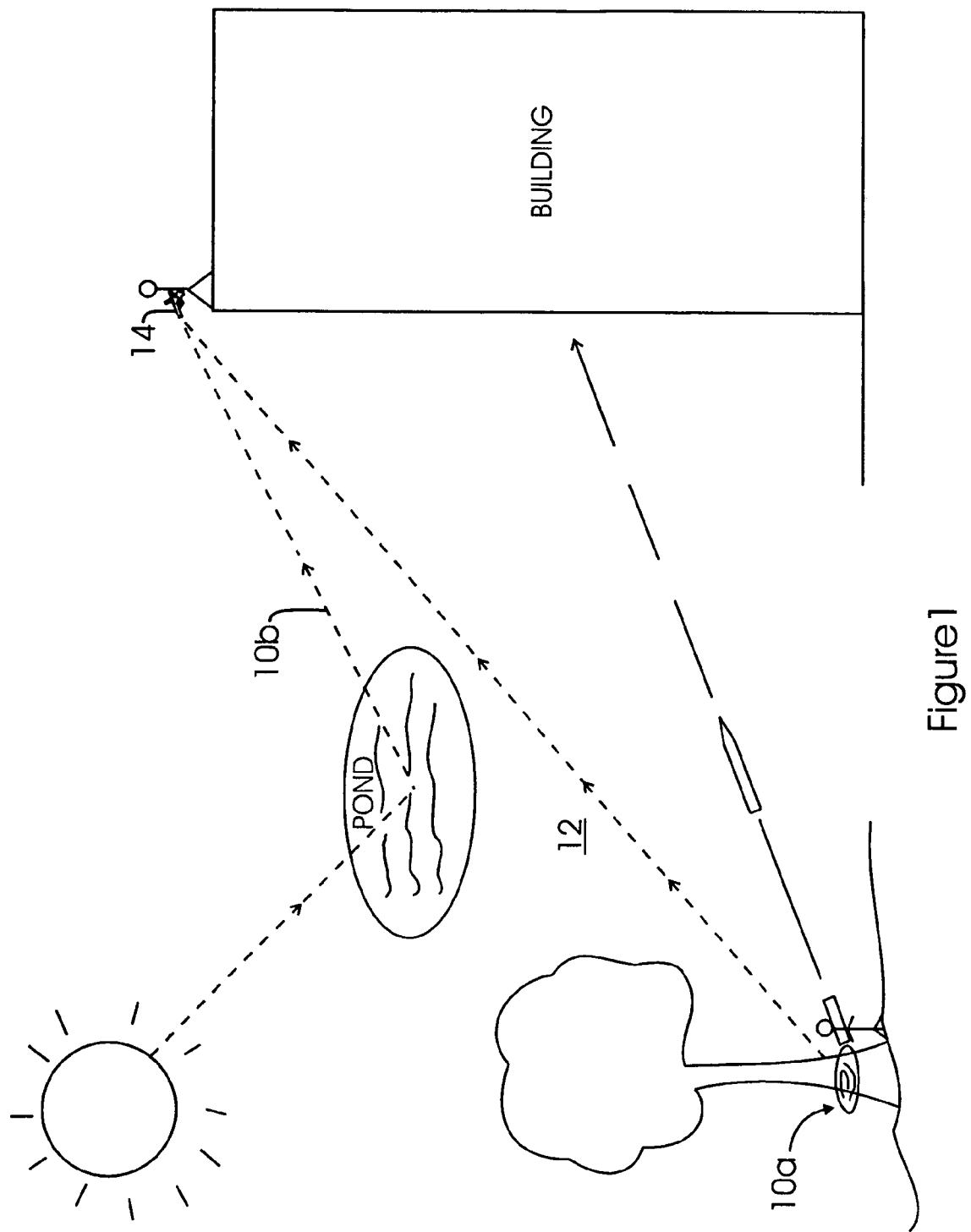
FIG. 1 illustrates light emitting events being detected and identified via an imaging device.

An imaging device 14 (see FIGS. 1, 2 and 4) may be provided. The imaging device 14 may be for the purpose of detecting-and identifying the light emitting event 10a. The light emitting event 10a may occur within the scene 12. Also, other light emitting events 10b may also occur within the scene 12. For example, as shown in FIG. 1, light emitting events 10a, 10b may occur simultaneously within the scene 12. Light emitting event 10a shown in FIG. 1 is a firing of a rocket, and light emitting 10b shown in FIG. 1 is a sun reflection off of a surface of a pond. By way of example and not limitation, the event 10a may be a man-made event such as a fire, small firearms flash, large firearms flash, laser, rocket propelled grenade, anti tank guided missile or a munition's explosion. Flashes determined to be not of interest are termed "clutter." The event 10b may also be a natural event 10b such as a bolt of lightning, camp fire, sun glint (e.g., reflection from pond surface), natural fire, etc.

The device 14 may initially distinguish events 10a, b occurring within the scene 12 as being those events of interest 10a and those events not of interest 10b. If the event 10a is of interest, then further event identification is desired. For example, in military applications, the device 14 may be utilized in hostile environments where hostile events 10a such as firing of an anti tank guided missile may occur. In these types of hostile environments, whether certain emitted lights are from hostile events 10a such as firing of an anti tank guided missile (i.e., events of interest) or whether it is from non hostile events 10b (i.e., events not of interest) may be necessary for military personnel. Hence, the device 14 may detect a flash of light 26 (see FIG. 2) emitted from the scene 12 and be able to distinguish whether the light flash is from a hostile source (i.e., event of interest) 10a or a non hostile source (i.e., event not of interest) 10b.

Figure 2:
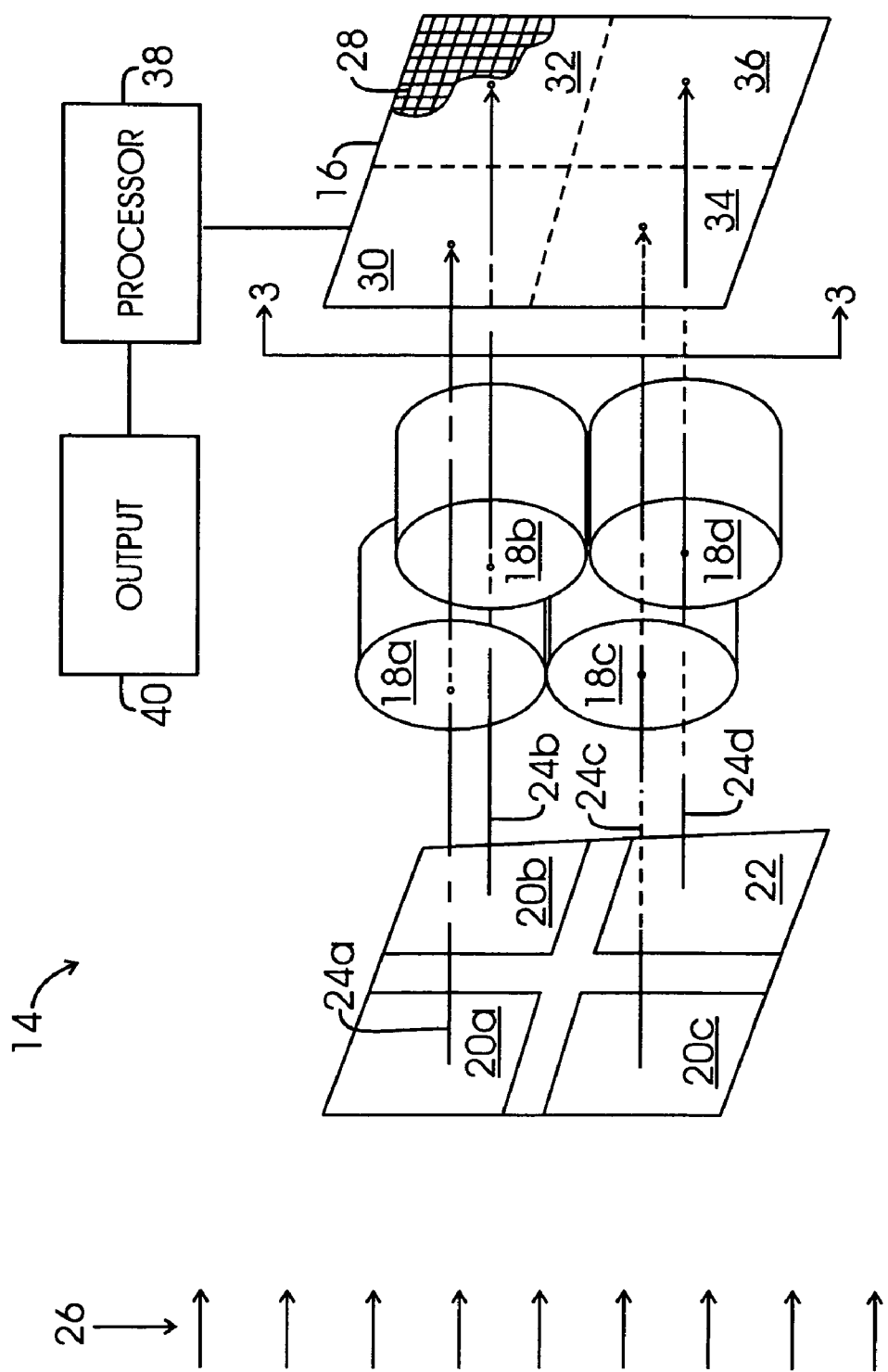
FIG. 2 is an exploded view of a first embodiment of the imaging device.

Referring now to FIG. 2, the device 14 may comprise a focal plane array 16. The device 14 may also have at least two imaging lens 18 adjacent to the focal plane array 16. FIG. 2 illustrates the device having four imaging lens 18a-d. The device 14 may also have at least one dispersive element 20 adjacent to the imaging lens 18. FIG. 2 illustrates the device 14 having three dispersive elements 20a, b, c adjacent to the imaging lens 18a, b, c, respectively. These dispersive elements 20a, b, c may be an optical transmission grating or a prism. Element 22 may be a non dispersive element (i.e., flat). Accordingly, every imaging lens 18a-d may not have a dispersive lens 20 adjacent thereto. These component parts 16, 18, 20, 22 of the device 14 may be aligned with respect to optical paths 24a, b, c, d of the light from the light emitting event 10a, b. These component parts 16, 18, 20, 22 may also each define a channel of the device 14.

Figure 4:
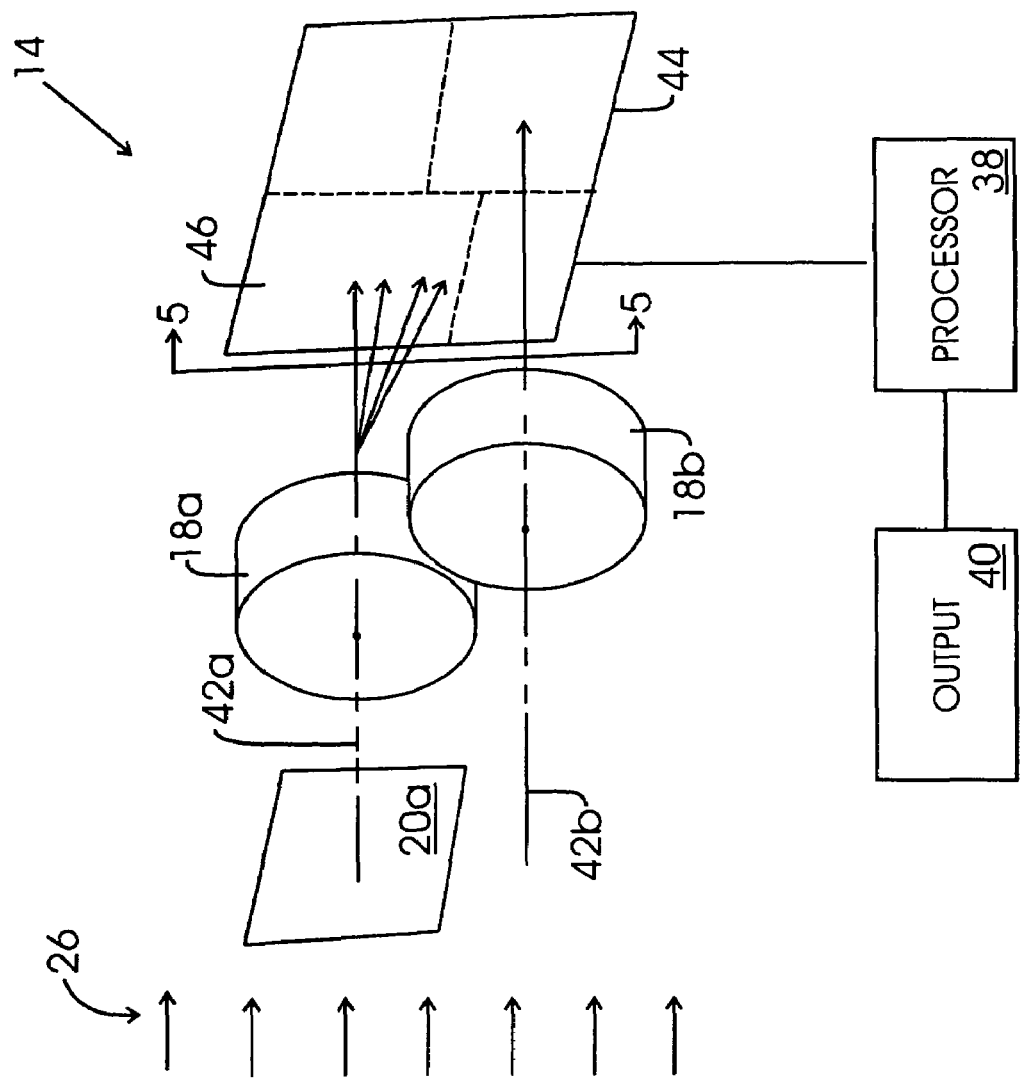
FIG. 4 illustrates a second embodiment of the imaging device.

The events 10a, b within the scene may emit light 26. Such light may be collimated, as shown in FIGS. 2 and 4. For example, the emitted light 26 may be a flash of light from a firearm muzzle. The emitted light 26 may travel along the optical paths 24a, b, c, d shown in FIG. 2. In particular, the emitted light 26 which may be collimated at the entrance aperture of the described sensor will travel through the dispersive elements 20a, b, c, imaging lens 18a, b, c, d and be received onto the focal plane array 16. As stated above, at least one of the imaging lenses 18 may not have a dispersive element 20 adjacent thereto. FIG. 2 illustrates imaging lens 18d not having a dispersive element 20 adjacent thereto. Rather, the element 22 may be flat such that there is no dispersion of the light 26 passing through the element 22. As such, non-dispersed light travels through imaging lens 18d.

Figure 3:
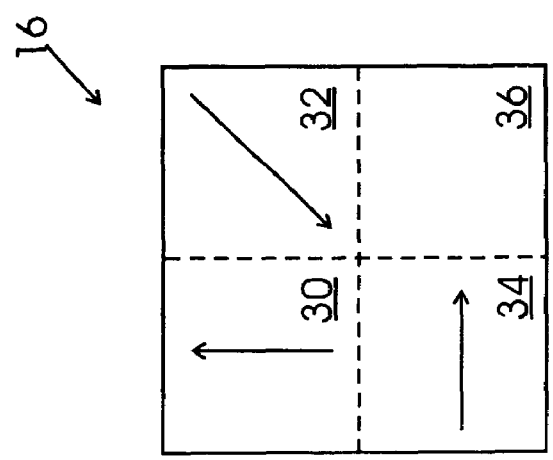
FIG. 3 is a top view of a focal plane array of the FIG. 2 imaging device illustrating that dispersive elements may orient dispersed light at different angular directions.

The dispersive element 20 may be a prism, optical transmission grating or the like so as to separate the light 26 traveling therethrough into different wavelength bands. More particularly, the light 26 may be split into many narrow, adjacent wavelength bands. The separated light 26 then travels through the imaging lens 18a-c which may focus the separated light 26 onto the focal plane array 16. The dispersive elements 20a-c may also direct the separated light toward different directions. For example, as shown in FIG. 3, the dispersive elements 20a-c may direct the separated light vertically, horizontally or diagonally.

The focal plane array 16 may receive the imaged and/or dispersed light. Imaged and dispersed light refers to the light 26 traveling along optical paths 24a, b, c. Imaged light refers to light traveling along optical paths 24d. The focal plane array 16 may measure the energy in each wavelength band via a plurality of detectors 28. The focal plane array 16 may comprise the plurality of detectors 28 (i.e., spectral bins). The detectors 28 may be placed adjacently next to each other. The detectors 28 when assembled may have a square or rectangular configuration as shown in FIGS. 2 and 3. The focal plane array 16 may be sized and configured to receive the imaged and/or dispersed light to measure the energy in each band.

Each detectors 28 may have a saturation point and noise. The saturation point of each detector 28 may be characterized as the maximum amount of energy measurable by the detector 28. For example, if energy received by the detector 28 is greater than the saturation point, then the energy above the detector's saturation point would not be measured by the detector 28. On the other hand, the detector noise may affect performance of the device because if sufficient energy is not received by the detector 28 then the energy received by the detector may not be differentiable from the detector noise.

Accordingly, the detectors 28 may be configured or selected such that its saturation point and detector noise matches the expected use of the device 14. In other words, if the device 14 is expected to be used in combat with light emitting events occurring approximately two hundred (200) yards away, the detectors 28 may be configured and selected such that expected light emitting events two hundred (200) yards away does not saturate the detectors 28 and the device 14 is able to differentiate between detector noise and the energy received by the detector 28.

Moreover, the dispersive elements 20a-c may have different spectral spreading characteristics such that at least some of the detectors 28 of a plurality of detectors may not receive energy above its saturation point and the energy received by the detector 28 may be sufficiently great such that the received energy is differentiable from the detector noise. To this end, the three dispersive elements 20a, b, c may each have a different spectral spreading characteristic. The dispersive elements 20a, b, c may have different spectral spreading performances ranging from a low amount of spectral spreading to a high amount of spectral spreading. Dispersive elements 20 with the high amount of spectral spreading divides the light into smaller wavelength bands (i.e., less energy in each band) compared to dispersive elements with the low amount of spectral spreading (i.e., more energy in each band). The dispersive elements 20 with the high amount of spectral spreading may be referred to herein as high dispersive elements. Also, the dispersive elements 20 with the low amount of spectral spreading may be referred to herein as low dispersive elements. Also, dispersive elements 20 with spectral spreading characteristics between the low and high dispersive elements may be referred to herein as medium dispersive elements. Dispersive element 20a may be a high dispersive element. Dispersive element 20b may be a medium dispersive element. Lastly, dispersive element 20c may be a low dispersive element.

The light traveling through each dispersive element 20a, b, c may also travel through respective imaging lens 18a, b, c and may be received by detectors 28 of the focal plane array. A set of detectors 28 may be associated with respective imaging lens 18 and dispersive element 20. In particular, a first set of detectors 30 may be associated with imaging lens 18a and dispersive element 20a. A second set of detectors 32 may be associated with imaging lens 18b and dispersive element 20b. A third set of detectors 34 may be associated with imaging lens 18c and dispersive element 20c. A fourth set of detectors 36 may be associated with imaging lens 18d and element 22.

This arrangement of having dispersive elements 20a, b, c having low, medium and high spectral spreading characteristics may ensure that at least one of a first, second or third set of detectors 28, 32, 34 does not receive energy greater than its saturation point and the received energy is differentiable from the detector noise. For example, a light emitting event may occur two hundred (200) yards away. However, the light when dispersed through the low dispersing element 20c may disperse the light into wavebands having energy greater than the saturation point. As such, the third set of detectors 34 may not be able to provide accurate information about the dispersed and imaged light through the dispersive element 20c and imaging lens 18c. However, since the dispersive elements 20a and 20b divides the light into more wavebands, less energy is contained within each waveband to thus make it more likely that the energy contained in those wavebands do not exceed the saturation points of the first or second set of detectors 30, 32.

Conversely, if the light emitting event 10 is very faint or far away then the dispersed and imaged light via the dispersive element 20a and imaging lens 18a may divide the energy into wavebands having miniscule amounts of energy which are not differentiable from the detector noise of the first set of detectors 30. However, since the dispersive elements 20b and c divides the light energy into fewer wavebands compared dispersive element 20a, more energy may be contained within each wavelength band compared to the light dispersed via dispersive element 20a such that sufficient amounts of energy may be contained in each waveband so as to be differentiable from the detector noise of the second and third sets of detectors 32, 34.

The dispersive element 20, imaging lens 18 and focal plane array 16 may produce a spectral profile of the detected light. In particular, each detector 28 may receive the separated wavelength bands and convert the received energy into information (i.e., spectral profile of detected light) which may be communicated to a processor 38. The communicated information may be processed via the processor 38 to detect whether the light emitting event is of interest 10a or not 10b. Once the event 10a, b is determined to be of interest 10a, the processor may further identify the type of light emitting event 10 by comparing the spectral profile of the detected light with known spectral profiles of light emitting events of interest 10a.

The detectors 28 may be arranged in rows and columns. Each detector 28 may be assigned a unique address such as row X, column Y. The detectors 28 may define the first set of detectors 30 which may receive light traveling through the imaging lens 18a. The detectors 28 may further define the second set of detectors 32 which may receive light traveling through imaging lens 18b. The detectors 28 may further define third, fourth, etc sets of detectors 34, 36 which may receive light traveling through third, fourth, etc imaging lens 18c, d. As shown in FIG. 3, the dispersive elements 20a, b, c may split the light into many different wavebands at different rotational angles (e.g., horizontally, vertically, diagonally). Since the collimated light 26 raveling through the imaging lens 18a, b, c, d and/or dispersive elements 20a, b, c, d is split into wavebands received into known sets of detectors 30, 32, 34, 36, the first, second, third and fourth sets of detectors 30, 32, 34, 36 may be correlated with each other. The correlation between the sets of detectors 30, 32, 34, 36 and the various directions of the dispersive elements 20a, b, c may provide position information of the event. In other words, the processor 38 may receive the information of the light 26 received by the detectors 28, correlate the information and calculate the event position which may be displayed on the output 40.

Figure 5:
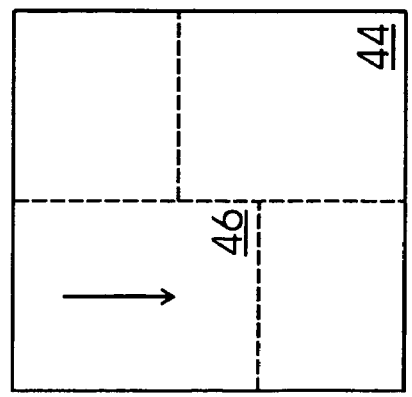
FIG. 5 is a-top view of a focal-plane array of the FIG. 4 imaging device.

In another aspect of the present invention, referring now to FIGS. 4 and 5, the device 14 may comprise a plurality of channels 42a, b. The channels 42a and 42b may comprise a first and second set of detectors 46, 44 adjacent to imaging lenses 18a, b, respectively. At least one of the channels 42a or 42b may have dispersive element 20a adjacent to imaging lens 18a. At least one of the channels 42a or 42b may be characterized as a broadband channel. FIG. 4 illustrates a device 14 with one broadband channel 42b and another channel 42a with dispersive element 20a, imaging lens 18a and first set of detectors 46 adjacent to each other. As shown in FIG. 5, the dispersive element 20a may disperse the light 26 vertically. It is also contemplated within the scope of the present invention that the dispersive element 20a may disperse the light horizontally or diagonally.

The light may travel through the imaging lens 18b and be received by the second set of detectors 44. The second set of detectors 44 may also transmit information related to the light received by the second set of detectors to the processor which may determine the existence of an event. In particular, the transmitted information may be processed with a frame subtraction image processing method to determine whether a light emitting event occurred. The light may also travel through the imaging lens 18a and be received by the first set of detectors 46. The first set of detectors 46 may also transmit information related to the light received by the first set of detectors to the processor. The processor may process specific detectors of the first set of detectors based on the information related to the light received by the second set of detectors to determine whether the light emitting event is of interest or not.

Figure 6:
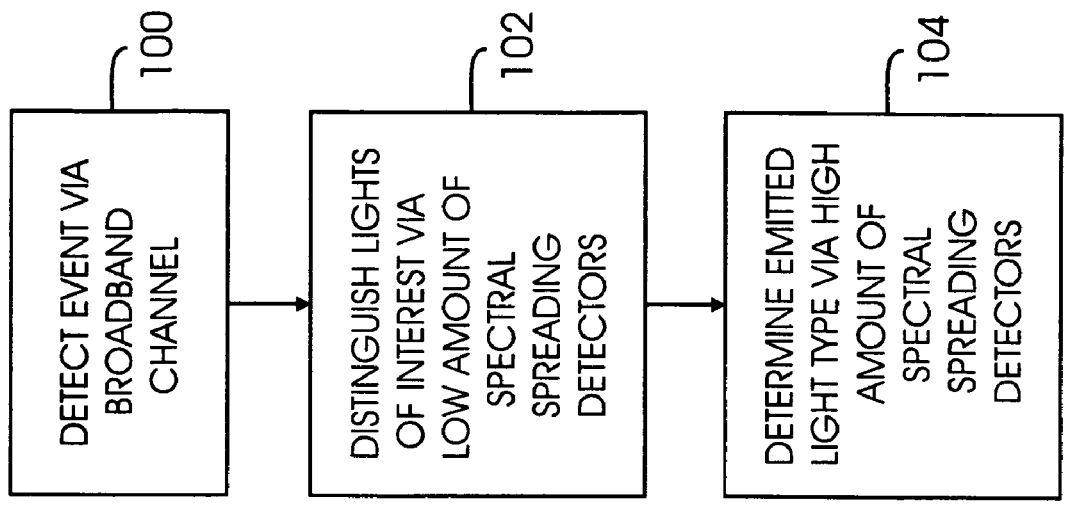
FIG. 6 is a flow chart illustrating steps for detecting and identifying the light-emitting event.

The device may have a broadband channel, a channel with a low dispersive element and a channel with a high dispersive element. In use, the light may travel through all three channels. However, initially, the light traveling through the broadband channel is received and processed by the processor to determine whether an event has recently occurred (step 100) as shown in FIG. 6. If an event has recently occurred then the processor may process the information related to the light passing through the low dispersive element by calculating a ratio between the different bands to determine whether the light emitting event is of interest or not. (step 102). If the event is of interest, then the processor may process the information related to the light passing through the high dispersive element to determine the type of event. In particular, the spectral profile of the detected light may be compared to known spectral profiles of events of interest (step 104).

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. An imaging device for detecting and identifying a light emitting event, the device comprising:
   first and second imaging lenses parallel to each other for receiving emitted event light therethrough;
   a first dispersive element in series with the first imaging lens and disposable between the first imaging lens and the light emitting event for dispersing emitted event light onto the first imaging lens; and
   a single focal plane array in series with the first and second imaging lenses for receiving the emitted event light imaged by the first and second lenses to detect and identify the event.

2. The device of claim 1 further comprising a processor in communication with the single focal plane array for correlating the emitted event light received by the single focal plane array.

3. The device of claim 1 wherein the single focal plane array comprises sets of detectors respectively associated with each lens and the sets of detectors receive the emitted event light traveling through the lenses, and the device further comprises a processor in communication with the sets of detectors for correlating the emitted event light received by each set of detectors.

4. An imaging device for detecting and identifying a light emitting event, the device comprising:
   first and second imaging lenses parallel to each other for receiving emitted event light therethrough;
   a first dispersive element in series with the first imaging lens and disposable between the light emitting event and the first imaging lens dispersing emitted event light onto the imaging lens; and
   c) a focal plane array in series with the first and second imaging lens for receiving the emitted event light traveling through the lenses, the focal plane array comprising sets of detectors operative to receive the emitted event light imaged by the first and second lenses and correlate the received emitted event light via a frame subtraction processing.

5. An imaging device for detecting and identifying a light emitting event, the device comprising:
   first and second imaging lenses parallel to each other for receiving emitted event light therethrough;
   first and second dispersive elements in series with respective first and second imaging lenses, the first and second dispersive elements having a different spectral spreading, the first and second dispersive elements being disposable between the light emitting event and the first imaging lens for dispersing emitted event light onto the first and second imaging lenses; and
   a focal plane array in series with the first and second imaging lenses for receiving the emitted event light imaged by the first and second lenses.

6. The device of claim 5 wherein the first and second dispersive elements have a different spectral spreading that is mutually exclusive.

7. The device of claim 1 wherein each dispersive element is oriented to disperse light in different directions.

8. The device of claim 1 wherein one imaging lens provides broadband imagery and another lens provides spectral profile.

9. The device of claim 1 wherein the lenses, element(s), and single focal plane array are spatially fixed to one another.

10. A method of detecting and identifying a light emitting event of interest, the method comprising the steps of:
   a) dispersing the emitted event light through first and second dispersive elements having different spectral spreading;
   b) focusing the dispersed emitted event light through first and second imaging lenses;
   c) receiving the dispersed and focused light on a single focal plane array such that light dispersed and focused through at least one of the first and second dispersive elements is below a saturation point of the single focal plane array;
   d) processing the received light via a processor; and
   e) indicating the detection and identification of the light emitting event of interest with an output device.

11. The method of claim 10 further comprising the steps of:
   f) detecting the light emitting event;
   g) distinguishing whether detected light from the lighted emitting event is of interest; and
   h) identifying a type of light emitting event.

12. A method of detecting and identifying a light emitting event of interest, the method comprising the steps of:
   a) dispersing the emitted event light;
   b) focusing the dispersed emitted event light through at least two lenses;
   c) receiving the dispersed and focused light on a single focal plane array;
   d) processing the received light via a processor;
   e) indicating the detection and identification of the light emitting event of interest;

f) detecting the light emitting event via a frame subtraction process;

g) distinguishing whether detected light from the lighted emitting event is of interest; and h) identifying a type of light emitting event.

13. A method of detecting and identifying a light emitting event of interest, the method comprising the steps of:

a) dispersing the emitted event light;

b) focusing the dispersed emitted event light through at least two lenses;

c) receiving the dispersed and focused light on a single focal plane array;

d) processing the received light via a processor;

e) indicating the detection and identification of the light emitting event of interest;

f) detecting the light emitting event via a frame subtraction process;

g) distinguishing whether detected light from the lighted emitting event is of interest by comparing a ratio defined by two adjacent bands of the dispersed light to known of events of interest; and h) identifying a type of light emitting event.

14. An imaging device for detecting and identifying a light emitting event, the device comprising:

first and second imaging lenses disposed physically parallel and adjacent to each other for receiving emitted event light therethrough;

a first dispersive element adjacent the first imaging lens and disposable between the light emitting event and the first imaging lens for dispersing emitted event light onto the first imaging lens; and a focal plane array in series with the first and second imaging lenses for receiving the emitted event light imaged by the first and second lenses to detect and identify the event.

* * * * *